United States Patent [19]

Mark

[11] Patent Number: 4,739,403
[45] Date of Patent: Apr. 19, 1988

[54] DIGITAL HORIZONTAL PROCESSOR

[75] Inventor: William J. Mark, Glenview, Ill.

[73] Assignee: Zenith Electronics Corporation, Glenview, Ill.

[21] Appl. No.: 45,709

[22] Filed: May 1, 1987

Related U.S. Application Data

[63] Continuation of Ser. No. 791,888, Oct. 28, 1985, abandoned.

[51] Int. Cl.[4] .............................................. H04N 5/14
[52] U.S. Cl. ..................................... 358/148; 358/150
[58] Field of Search ............... 358/158, 159, 148, 150, 358/151, 153

[56] References Cited

U.S. PATENT DOCUMENTS 3,781,470 12/1973 Horn .................................... 358/158
3,891,800 6/1975 Janssen et al. ...................... 358/159
4,351,001 9/1982 McGinn ............................... 358/158

Primary Examiner—James J. Groody
Assistant Examiner—David E. Harvey

[57] ABSTRACT

A digital horizontal processor includes a first counter initiated by a horizontal sync pulse for determining a first time interval. When the first counter overflows, it initiates counting in a second counter and in a third counter and initiates a horizontal drive pulse. A feedback pulse is developed at the center of retrace of the video. A latch is coupled between the first and second counters. A reset pulse periodically enables a flip flop to generate, upon occurrence of the feedback pulse, a correction signal to operate the latch to load the count of the second counter into the first counter as a preset. The overall time from horizontal sync to center of retrace is held constant.

7 Claims, 4 Drawing Sheets

DIGITAL HORIZONTAL PROCESSOR

This application is a continuation of Ser. No. 791,888, filed Oct. 28, 1985, now abandoned.

BACKGROUND OF THE INVENTION

This invention relates generally to video display systems and particularly to precision video display systems and/or video display systems that are capable of generating displays at different horizontal scan rates.

Video display systems geerally comprise monitors that use a cathode ray tube (CRT) to visually display appropriate input signals from a plurality of sources. Monitors are well known in the art and are experiencing a large increase in usage. Video monitors, or display terminals as they are often referred to, are primarily used to display output data from a host computer. In many applications, a great deal of precision is required and conventional analog type video display terminals may not be suitable. For example, the position or size of a video display may change with temperature, aging of components, horizontal scan rate and the like. In precision video monitors, a slight change in position of the display, for example, can result in a column or row of characters or pixels being hidden from view. Further, many users require that the monitor be capable of producing more than one display speed, that is, different numbers of pixels per horizontal line and/or different numbers of vertical rows. In such a high density display, it is important to have a high resolution CRT system because of the degree of legibility required.

Most analog display system technology may be traced back to television technology that was developed a number of years ago. The horizontal scan system, for example, is generally controlled by a horizontal phase lock loop which maintains the deflection frequency constant at a nominal 15.750 kilohertz. These systems do not lend themselves readily to an increase in horizontal scan rate without a corresponding increase in phase error. The horizontal phase error, or display position, in a high resolution video display system may be required to be held to within ±1 pixel in a 1000 pixel wide system (0.022" in an 11" display), and thus must be closely controlled. Analog display systems are unable to maintain such precise control without becoming extremely complex and costly. Accordingly there is a need in the art for a horizontal processor system that is very stable, economical and capable of generating a variety of horizontal scanning rates for a high resolution display system.

OBJECTS OF THE INVENTION

Accordingly the principal object of the invention is to provide a novel horizontal processor.

Another object of the invention is to provide a horizontal processor that is very stable, economical, and capable of generating a plurality of horizontal scanning rates.

A further object of the invention is to provide a digital horizontal processor.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
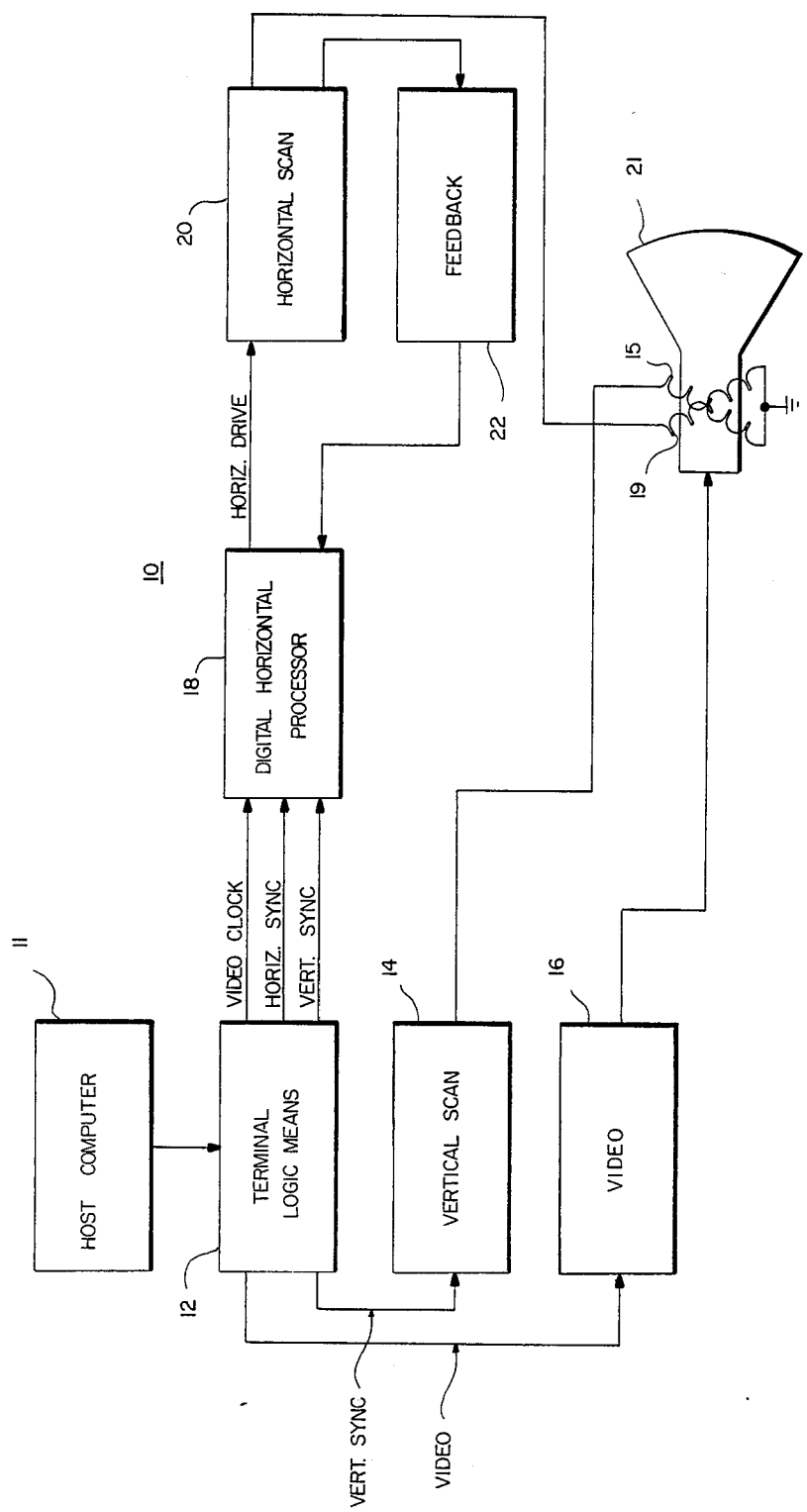
FIG. 1 is a block diagram of a video display system including a horizontal processor constructed in accordance with the invention.

Referring to FIG. 1, a video display terminal 10, incorporating a digital horizontal processor constructed in accordance with the invention, includes terminal logic means 12 for accepting digital information from a host computer 11 and for generating horizontal and vertical synchronizing (sync) pulses and a video clock frequency and supplying them to a digital horizontal processor 18, the output of which consists of a horizontal drive signal. The horizontal drive signal is supplied to horizontal scansion means, comprising a horizontal scan circuit 20, which develops appropriate horizontal deflection signals and supplies them to a horizontal deflection winding 19 located on the neck of a CRT 21. Terminal logic means 12 also supplies vertical sync information to a vertical scansion means, comprising vertical scan circuit 14, and video signal information to a video circuit 16. Vertical scan circuit 14 develops vertical deflection signals and supplies them to a vertical deflection winding 15 on CRT 21. The output of video circuit 16 is also supplied to CRT 21. The horizontal and vertical scan circuits, video circuit, deflection windings and CRT are all well known in the art. For purposes to be explained below, a feedback circuit 22 is connected between horizontal scan circuit 20 and digital horizontal processor 18 for supplying a signal that is coincidental with the center of horizontal retrace. The horizontal scan circuit conventionally operates to deflect the CRT electron beam and generate a horizontal line or trace across the face of CRT 21, followed by a rapid retrace across the face of CRT 21, on a repetitive basis. Meanwhile the vertical scan circuit is similarly operating, at either a constant rate or in a stepped manner, to displace the electron beam downwardly so that successive horizontal lines or traces are vertically displaced. Thus scansion of the faceplate of CRT 21 is accomplished.

The terminal logic means formats the digital information and the synchronizing pulses. A horizontal flyback pulse, also referred to herein as a horizontal feedback pulse, is developed during horizontal retrace and marks the center of retrace of the video information. The center of retrace corresponds to the physical center of the raster scanned on the CRT. The video clock constitutes the master timing control signal and may be conventionally produced by means of a crystal controlled oscillator, the frequency of which is significantly higher than that of the horizontal deflection signal. The horizontal and vertical deflection signals may be conveniently developed by counting down from the video clock frequency which assures that the horizontal and vertical sync signals are synchronized with the video information. Thus, while many sources of digital information may be supplied to terminal logic means 12 for use in connection with the video display terminal, it should be borne in mind that the video information is locked with respect to the horizontal and vertical sync.

Figure 2:
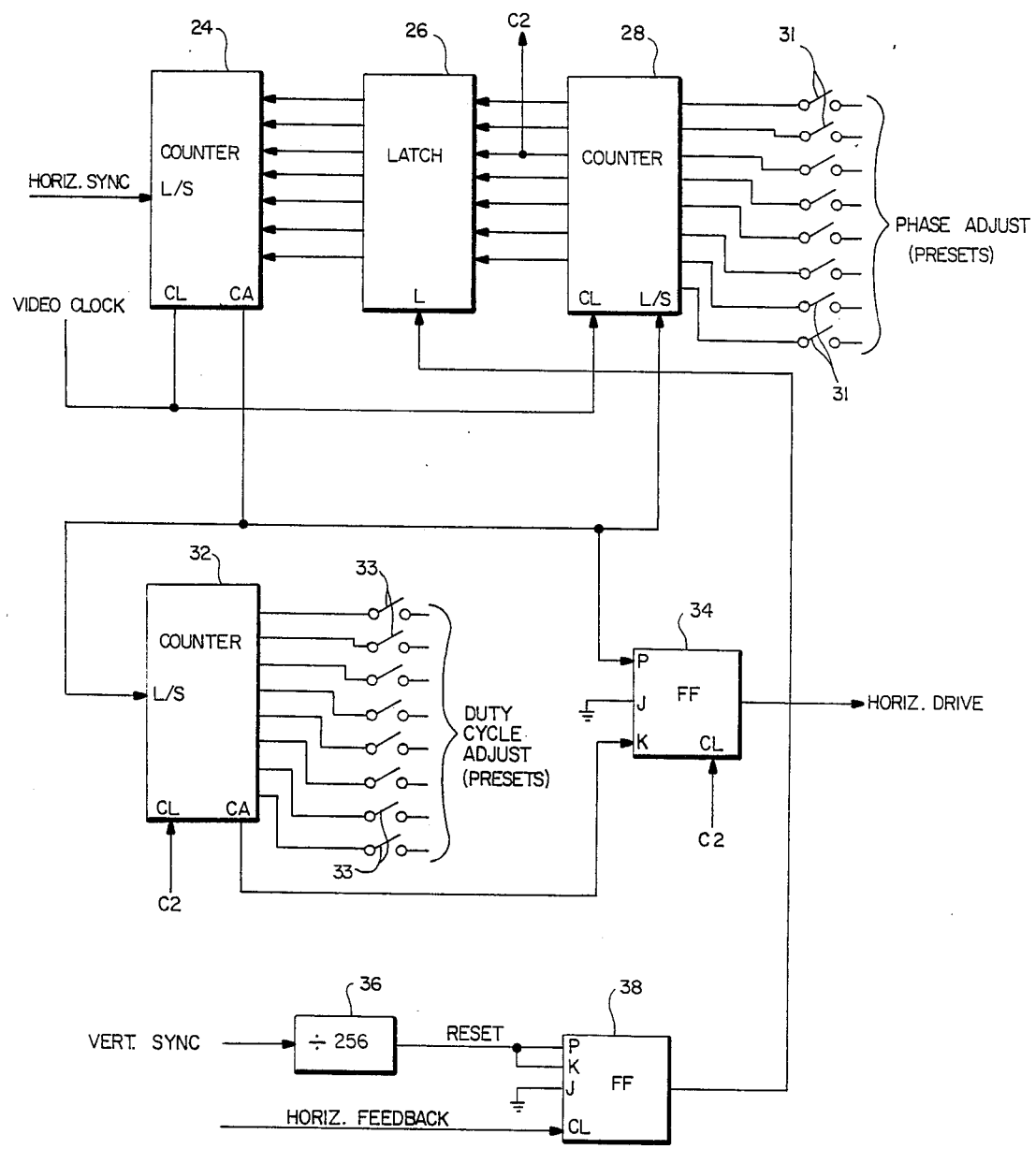
FIG. 2 is a block diagram of a digital horizontal processsor constructed in accordance with the invention.

FIG. 2 represents a block diagram of the digital horizontal processor of the invention. The horizontal sync input is supplied to counter means 24 having a load/-start (L/S) input and an internal eight bit counter. The counter means, or counter as it will be referred to, has a plurality of inputs coupled for receiving data from the outputs of an eight bit latch 26. The inputs of latch 26 are similarly connected to another counter means 28 having an L/S input and an internal eight bit counter. The video clock signal is supplied to the clock (CL) inputs of counters 24 and 28. The carry (C/A) output of counter 24 is supplied to the L/S input of counter 28, to the input of a counter means 32, having an L/S input and an internal eight bit counter, and to the preset (P) input of a flipflop (FF) 34. The CA output of counter 32 is supplied to the K input of FF 34, and its J input is connected to ground. The output signal from FF 34 constitutes the horizontal drive signal, which is a pulse, the duty cycle of which is determined as explained below. The CL inputs of counter 32 and FF 34 are supplied with a further divided down clock signal obtained from the appropriate one of the output leads of eight bit counter 28. As indicated, the output signal from the video clock is divided by four at the clock inputs of counter 32 and FF 34. The vertical sync is supplied through a divide-by-256 counter 36, the output of which constitutes a reset pulse. Another FF 38 has its P and K inputs connected to receive the reset pulse, its J input connected to ground, and its CL input connected to receive the horizontal feedback pulse. The output of FF 38 is coupled to the load (L) terminal of latch 26. The inputs of counter 28 are connected to a plurality of switches 31 for coupling appropriate potentials thereto to establish a preset count for counter 28. Since, as will be explained, the count in counter 28 establishes a preset for counter 24, which initiates the horizontal device pulse, the presets established by the totality of the switches 31 constitute a phase adjustment circuit for establishing the phase of the horizontal drive pulse. The entire arrangement of presets may thus be thought of as a delay means. Similarly the inputs of eight bit counter 32 are coupled to a plurality of switches 33 for establishing a preset count for this counter. This preset determines how long it takes for the counter to overflow and to terminate the horizontal drive pulse, thus providing a duty cycle adjustment. These will be explained in more detail later.

Operationally speaking, the reset pulse may be considered the equivalent of a Power Up or Turn On signal for generating a correction signal for loading the contents of latch 26 into eight bit counter 24, as a preset count. The next horizontal sync pulse initiates counting of counter 24 from this present count and, when counter 24 reaches its capacity, it overflows and provides a carry pulse at its CA output. The CA pulse is applied to initiate counting in counter 28 and in counter 32, both of which have presets (via switches 31 and 33, respectively) that are loaded therein. As mentioned the presets may be either established by the switches as shown or they may be hard-wired at the factory. The presets may be calculated or determined empirically and are directly related to the timing of the video and horizontal sync signals. As will be appreciated by those skilled in this art, the same presets can be used for different horizontal scan rates, provided, however, the video clock frequency is changed in the same ratio, which is the usual case. Alternatively, the video terminal logic means, or a suitable switch arrangement on the video terminal may be used to change the presets to those appropriate to the display format selected. Because of the stability of the horizontal processor of the invention, the presets may be established at the factory and there is no need for field set-up.

Figure 3:
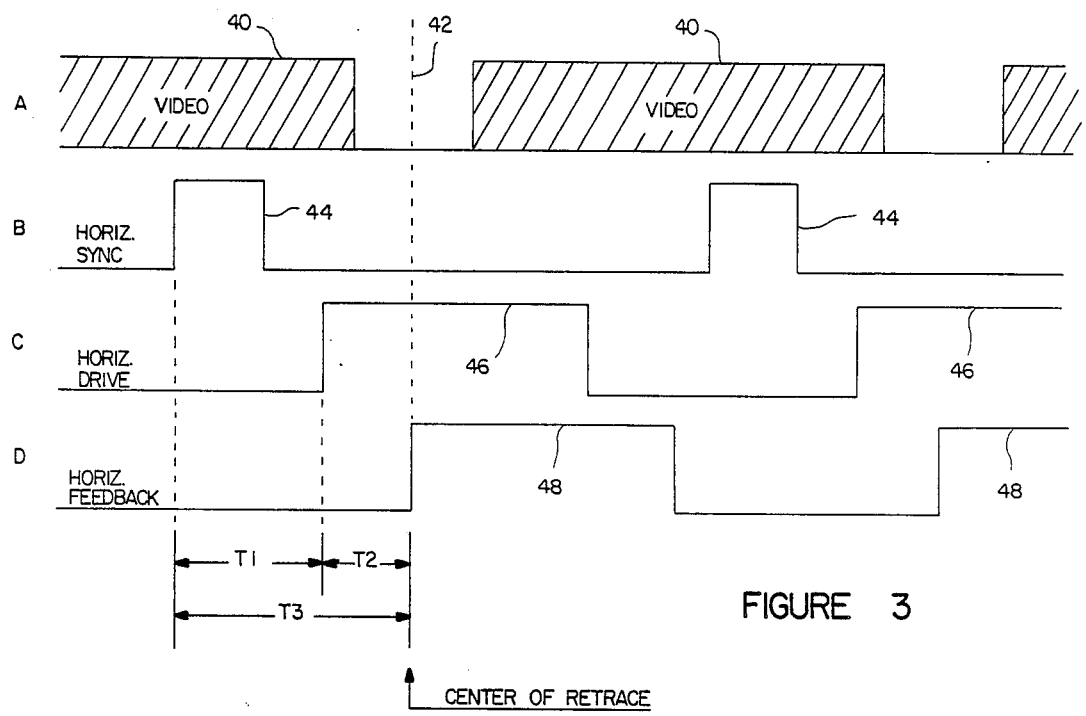
FIG. 3 is a series of waveforms depicting operation of the horizontal processor of FIG. 2.

Reference to FIG. 3 at this point may be helpful. Waveform A represents video information or data portions 40 centered about a dashed line 42 that represents the center of retrace. It will be appreciated that video information portions 40 are illustrative only, and represent the time periods during which video information may appear. Waveform B shows horizontal sync pulses 44, which it will be recalled, bear a fixed relationship to dashed line 42, representing the center of retrace. Waveform C is a horizontal drive pulse 46 and waveform D represents a horizontal feedback pulse 48. Time T1 is the time interval between the commencement of a horizontal sync pulse 44 and the commencement of a horizontal drive pulse 46; time T2 the time interval between commencement of a horizontal drive pulse 46 and center of retrace 42; and time interval T3=T1+T2, thus representing the elapsed time from horizontal sync pulse commencement to the center of retrace. The invention maintains the overall time T3 constant to assure a precise control of the display.

When counter 24 overflows, that is, when it reaches its count capacity, its CA output goes high. Since counter 24 was initiated by the leading edge of a horizontal sync pulse, CA going high marks or defines the time interval T1. The CA output of counter 24 also starts counter 28, operates on FF 34 to force it to initiate the horizontal drive pulse, and starts counter 32. Center of retrace is marked by a horizontal feedback pulse which, while applied to FF 38, is ineffective unless it occurs during occurrence of a reset pulse. When these concur FF38 operates to produce a correction signal to load the contents of latch 26 into counter 24. The contents of latch 26 represent the count that is in counter 28 at the occurrence of the horizontal feedback pulse, which is the result of the presets from switches 31 and the number of clock pulses counted. This is time interval T2, which is the elapsed time between the commencement of a horizontal drive pulse and the center of retrace, as represented by development of the horizontal feedback pulse. Thus the time period T1, i.e. the elapsed time from the initiation of a horizontal sync pulse to the commencement of a horizontal drive pulse has been synthesized by the counters and the presets and is rigorously controlled thereby. Thus the center of retrace is locked to the horizontal sync and an extremely stable video display results.

As mentioned, counter 32 establishes the duty cycle of the horizontal drive pulse. As is well known in the art, this pulse must persist for a long enough time to assure consistent operation of the horizontal circuit, yet not so long as to create heat dissipation problems. The presets enable an optimum duty cycle to be established for the circuit.

To assure that the video display does not move horizontally despite temperature changes and aging of various components, a reset pulse is periodically applied to enable the feedback pulse to make any needed changes in the relative counting times T1 and T2. The overall count, or counting time T3 is kept constant. Thus, for example, a change in the junction saturation characteristics of the housing output transistor resulting in a change in T2 will dictate an equal and opposite change in T1 thereby maintaining T3 constant to prevent a shift of the display. This change is made at the next reset pulse. Since generation of the horizontal feedback pulse is a function of initiation of the horizontal drive pulse and the deflection circuit operation, a change in the circuit will be reflected in a change in timing of the horizontal feedback pulse. If it is caused to be delayed, T1 is correspondingly decreased to cause the horizontal drive pulse to be generated earlier to compensate for the delay. The object is to keep the feedback pulse and horizontal sync in a fixed relationship to each other.

Assume for illustrative purposes only, that T1=100, T2=50 and T3=T1+T2=150. Assume further that no reset pulse has been generated. For each horizontal line of the display, counter 24 counts (with the output of latch 26 as a preset) to initiate a horizontal drive pulse 100 clock pulses after each horizontal sync pulse. Although counter 28 counts 50 clock pulses from the initiation of a horizontal drive pulse to the center of retrace, no use is made of that clock pulse count information. (All of the counters count to their capacity and stop are restarted by an appropriate input on their L/S terminals.) Assume further that a delay has occurred, due to temperature perhaps, in the switching of the horizontal output transistor. Thus the horizontal flyback pulse and thus the feedback pulse is delayed slightly. On the screen, the video display will be moved slightly to the left. The change is "recorded" in counter 28 since it will have counted more clock pulses by the time the feedback pulse occurs. Assume that counter 28 counts 51 clock pulse from the time of initiation of the horizontal drive pulse to the center of retrace instead of 50 clock pulses.

When a reset pulse occurs, the leading edge of the displayed horizontal feedback pulse will trigger a correction signal output from FF 38 to transfer the input signals on latch 26 to its output. The inputs of the latch represent the total count in counter 28 and comprise the presets from switches 31 plus the 51 clock pulses. This total count becomes the new preset for counter 24, which is now one count greater than its last preset. Thus at the next horizontal sync, counter 24 counts from the new preset and will overflow at a count of one less than before. Thus, instead of counting 100 clock pulses, counter 24 counts only 99 before overflowing and the initiation of the horizontal drive pulse occurs a little sooner to compensate for the increase in switching time of the horizontal transistor. T1 now equals 99, T2 equals 51 and T3 remains constant at 150. Thus the time between the horizontal sync leading edge and the center of retrace is constant and the display does not shift, even though a change has occurred in the drive circuitry.

It will be appreciated that the signals on the output of latch 26 remain until a subsequent load signal is received. Also, FF38 is edge triggered and only provides a correction signal to latch 26 upon occurrence of the leading edge of the first horizontal feedback pulse during occurrence of a reset pulse.

Figure 4:
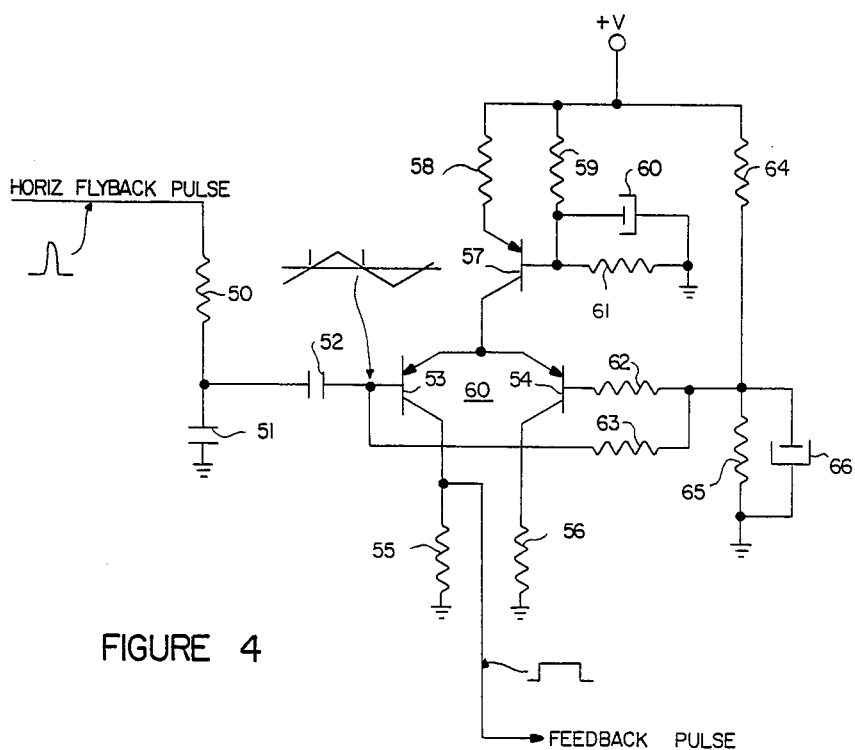
FIG. 4 is a partial schematic diagram of a feedback cicuit for use in conjunction with the horizontal processor of the invention.

FIG. 4 represents the schematic diagram of a circuit for developing the feedback pulse for the digital horizontal processor from the horizontal flyback pulse. The horizontal flyback pulse is applied to an integrater comprising a resistor 50 connected in series with a capacitor 51 that is connected to ground. The junction of resistor 50 and capacitor 51 is coupled, through a coupling capacitor 52, to one input of a differential amplifier 60.

Differential amplifier 60 comprises a pair of PNP transistors 53 and 54 having their collector electrodes connected to ground through resistors 55 and 56, respectively, and their emitter electrodes connected to a current source transistor 57 which, in turn, is supplied through a resistor 58 from a source of B+ potential. The base electrode of current source transistor 57 is biased by means of a resistor 59 connected in series with the parallel combination of an electrolytic capacitor 60 and a resistor 61. Bias for the transistors in differential amplifier 60 is provided by a resistor 61 connected in series with the parallel combination of a resistor 65 and a filter capacitor 66 connected between B+ and ground. The junction of resistor 61 and resistor 65 is connected to the base electrode of each differential amplifier transistor through a resistor 62 and a resistor 63, respectively. Thus, as the horizontal flyback pulse, which is converted to a sawtooth waveform, is applied to the base of transistor 53, transistor 53 is driven into heavy conduction at the middle of the rising portion of the integrated waveform and remains in conduction until the middle of the falling portion of the sawtooth waveform. Hence the square wave feedback pulse is developed across resistor 55 for application to the digital horizontal processor.

Figure 5:
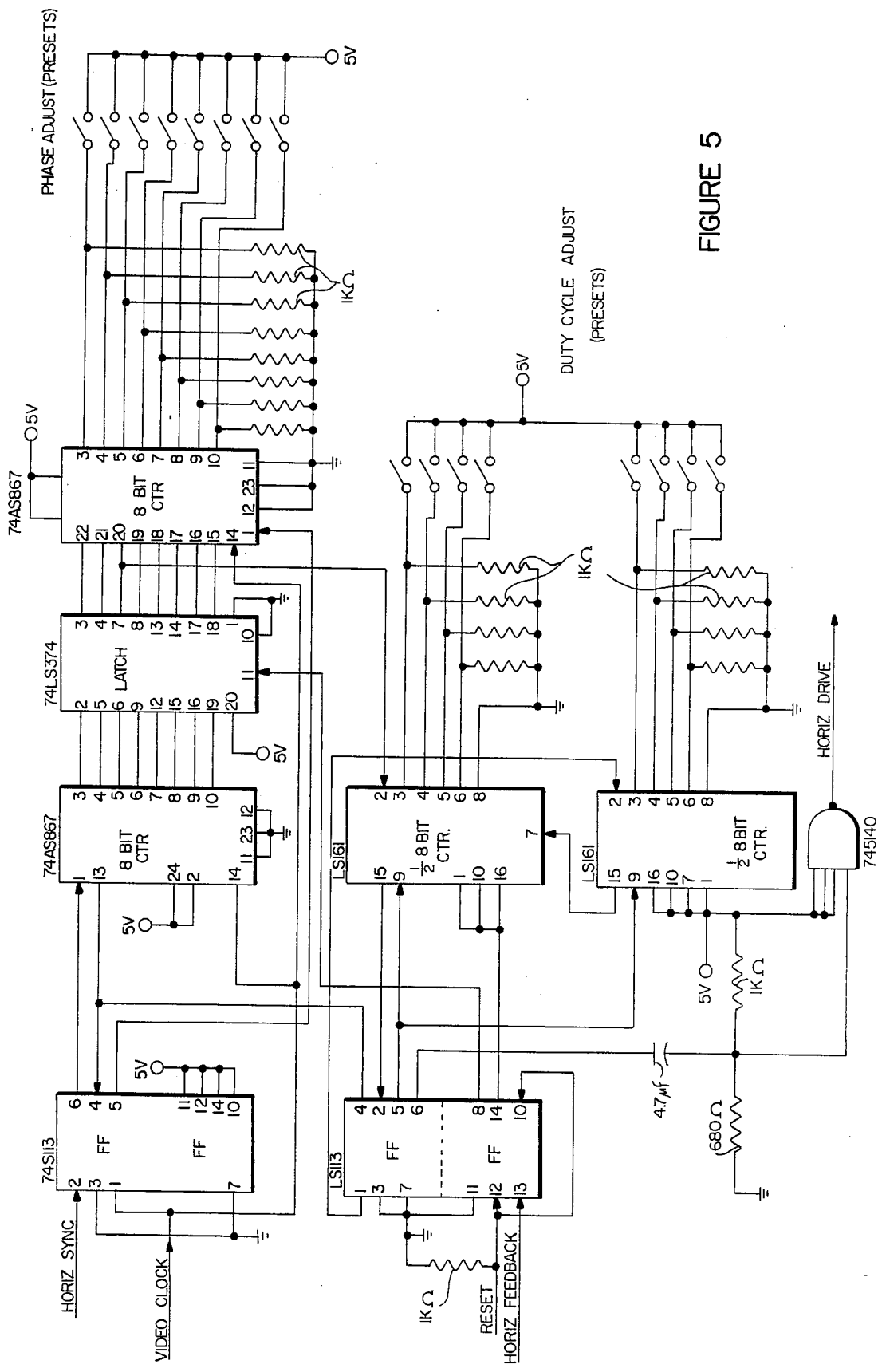
FIG. 5 is a schematic diagram of the horizontal processor of the invention.

The actual schematic for the digital horizontal processor is shown in FIG. 5 and consists of a plurality of integrated circuits and a NAND gate. The part numbers listed are those of the Texas Instruments Corporation and all of the integrated circuits are readily available. The pin numbers of the integrated circuits are shown, as are the values of the discrete components. A one-for-one correlation with the block diagram of FIG. 2 does not exist since the block diagram is much more functional in nature. The horizontal processor of the invention is entirely in digital form. While the circuits supplying the horizontal processor are shown in analog form, it will be appreciated that the invention should not be restricted thereto.

What has been described is a novel digital horizontal processor for a video display system that is extremely stable, capable of use with a plurality of horizontal scan frequencies, simple in construction and economical. It is recognized that numerous modifications and changes in the described embodiment of the invention will be apparent to those skilled in the art without departing from its true spirit and scope. The invention is to be limited only as defined in the claims.

I claim:

1. A horizontal processor for use in a video display system that is supplied with video signal information and that includes means for generating horizontal and vertical sync pulses and for supplying horizontal drive signals to a horizontal scansion means, said scansion means developing horizontal retrace pulses, comprising:

delay means, including a first counter for initiating each one of said horizontal drive signals a predetermined time after occurrence of a respective one of said horizontal sync pulses;

means, including a second counter responsive to said retrace pulses for determining the time elapsed between said initiating of each one of said horizontal drive signals and the occurrence of a respective one of said retrace pulses; and means for monitoring a sum of said predetermined time and of said elapsed time and means for generating a correction signal for periodically correcting said predetermined time in relation to said elapsed time.

2. The processor of claim 1 wherein the processor further includes latch meas coupled between said first and said second counters and wherein said latch means, responsive to said correction signal, supplies the count from said second counter as a preset for said first counter for correcting said predetermined time.

3. A horizontal processor for use in a video display system that is supplied with a video signal having means for generating horizontal and vertical sync pulses and means for supplying horizontal drive signals to a horizontal scansion means, said scansion means developing horizontal retrace pulses, comprising:
   first counting means for initiating each one of said horizontal drive signals a predetermined time after occurrence of a respective one of said horizontal sync pulses;
   second counting means commencing to count responsive to the initiation of each of said horizontal drive signals;
   latch means coupled between said first and said second counting means; and
   means for generating a correction signal for operating said latch means to load the count in said second counting means as a preset in said first counting means for periodically changing said predetermined time in relation to the time elapsed between the initiation of one of said horizontal drive signals and the occurrence of a respective one of said horizontal retrace pulses.

4. A digital horizontal processor for use with a source of clock pulses, horizontal and vertical sync pulses synchronized to said clock pulses and horizontal feedback pulses coincident with the center of retrace of a video display comprising:
   a first counter coupled to said source of clock pulses and initiated responsive to one of said horizontal sync pulses for generating an overflow signal after counting a predetermined number of said clock pulses for initiating a horizontal drive signal;
   a second counter coupled to said source of clock pulses and having a set of presets and being initiated by said overflow signal of said first counter for counting said clock pulses; and
   means responsive to a horizontal feedback pulse for applying the count accumulated in said second counter as a preset for said first counter.

5. The processor of claim 4 wherein said means for applying comprises a latch coupled between the input of said first counter and the output of said second counter.

6. The processor of claim 5 wherein said means for applying further includes means developing a reset pulse in response to said vertical sync pulses and a gate having an output connected to said latch and a pair of inputs, said reset pulse and said feedback pulse being coupled to said pair of inputs.

7. A digital horizontal processor for use with a video display system having a source of video information, means for generating horizontal and vertical deflection signals, a source of clock pulses and means for producing a horizontal feedback pulse comprising:
   a first counter having a horizontal sync input;
   a latch coupled to said first counter;
   a second counter coupled to said latch and being initiated responsive to overflow of said first counter;
   means for generating a horizontal drive signal responsive to said overflow of said first counter;
   phase adjustment means for said horizontal drive signal comprising a plurality of presets for said second counter;
   a third counter connected to said first counter and operated in response to overflow of said first counter;
   duty cycle adjustment means for said horizontal drive signal comprising a plurality of presets for loading a preset count into said third counter; and
   a flip flop for operating said latch in response to said horizontal feedback pulse whereby contents of said second counter are loaded into said first counter responsive to said horizontal feedback pulse.

* * * * *